Dec. 5, 1944.     B. SVIRSKY     2,364,107
SILENT SCREWLESS VALVE PLUG
Filed June 3, 1943
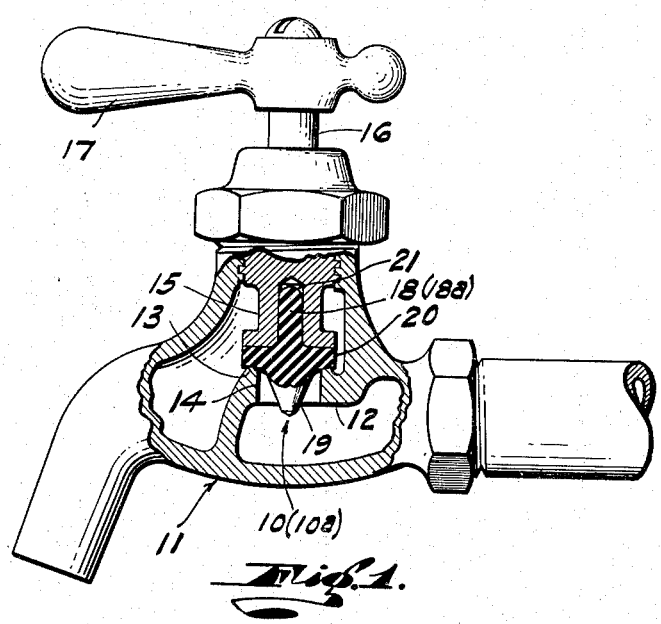
Fig. 1.
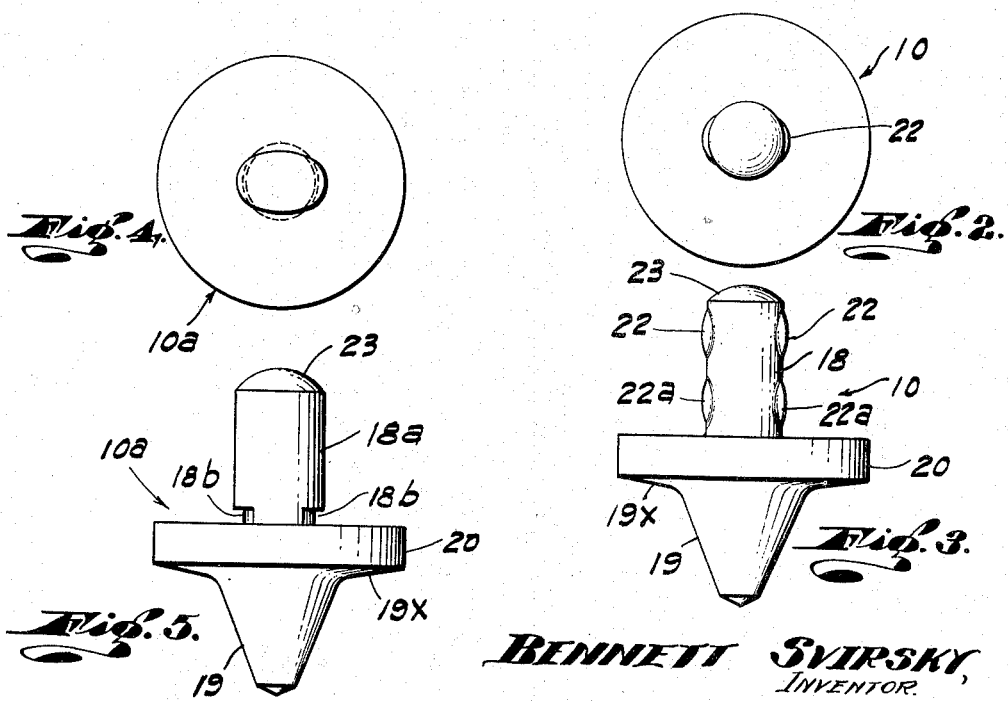
Fig. 4.   Fig. 2.
Fig. 5.   Fig. 3.
BENNETT SVIRSKY, INVENTOR.
By *[signature]* ATTORNEY.

Patented Dec. 5, 1944

2,364,107

UNITED STATES PATENT OFFICE 2,364,107

SILENT SCREWLESS VALVE PLUG

Bennett Svirsky, Glendale, Calif., assignor of fifteen per cent to Irving Svirsky, New Haven, Conn.

Application June 3, 1943, Serial No. 489,564

9 Claims. (Cl. 251—159)

This invention relates to a silent screwless valve plug.

Heretofore there has not been placed upon the market a valve member consisting solely of a piece of gasket-forming material so shaped as to maintain itself safely in place within an unthreaded bore provided for it in the movable part of a valve, when brought into its mounted position within such bore by having applied to it sufficient force to deform it from its normal not only as to size but also as to contour so that its elasticity firmly retains it in its inserted position.

The general object of this invention is to provide a desirable means for filling the above indicated long-felt need, without using parts, now hard to obtain because of abnormal conditions.

A further object of the invention is to provide a needed silencing means which is embodied in the gasket portion of the valve.

Still another object relates to a new article of manufacture embodying a silent screwless valve plug.

With the foregoing and other objects in view, the invention resides in the novel arrangement and combination of parts and in the details of construction hereinafter described and claimed, it being understood that changes in the precise embodiment of the invention herein disclosed may be made within the scope of that which is claimed without departing from the spirit of the invention.

Referring to the accompanying drawing, which illustrates what are at present deemed to be preferred embodiments of the invention, Fig. 1 is a partly elevational and partly midsectional view of a faucet having installed within it a valve member embodying the invention, the valve being seated.

Figs. 2 to 5 illustrate on an enlarged scale two different embodiments of the valve member, either of which embodiments would be truly represented by the showing of Fig. 1.

Fig. 2 is a plan view of one of said embodiments.

Fig. 3 is a side elevation of the structure shown in Fig. 2.

Fig. 4 is a plan view of the other of said embodiments.

Fig. 5 is a side elevation of the structure shown in Fig. 4.

Referring in detail to the drawing, the newly invented valve plug 10 (or 10a) is shown in Fig. 1 installed in a faucet body 11 having within it a horizontally extending wall 12 which carries a valve seat 13 surrounding the mouth of the valve passage 14. The illustrated turnable valve stem 15 is of the screwthreaded type and carries a shaft portion 16 to which is attached the operating handle 17.

In order to provide for the valve seat 13 a sealing means in the form of a unitary plug or gasket 10 or 10a, a top-shaped body of rubber or other compressible, elastic material is formed, said body having an axially projecting stem 18 at one side, an axially projecting conical part 19 at the side opposite to said stem and an intervening disk-like or circular part 20, said stem 18 being adapted to be forcibly projected into the bore 21 of the valve stem 15, which it consequently occupies while in a deformed condition, thereby safely maintaining the valve plug 10 in its operative position during the opening and closing movements of the valve as well as while the liquid flows therethrough.

In the embodiment of the valve plug shown in Figs. 2 and 3 the stem 18 thereof has its body portion of substantially the same diameter as the diameter of the valve stem bore 21, but has integral with it convex rises or buttons 22, 22a, which are desirably arranged in pairs, as shown, the two buttons 22 constituting an upper pair which are diametrically opposite to each other and the lower buttons 22a being similarly positioned. It is evident that the projections or buttons just mentioned may be varied in size and shape and still perform their function efficiently, but they should always be beveled in such a manner as to facilitate the insertion of the stem of the washer into the bore provided for it.

In Figs. 4 and 5 is shown another embodiment of the plug, which differs from the form thereof already described only in the shape of its stem 18a. Said stem 18a, as best seen in Fig. 4, as to its transverse contour, is elliptical instead of circular, the long axis of the ellipse being somewhat greater than the diameter of the valve stem bore 21 and its short axis being somewhat less than the diameter of said bore. Also said stem 18a has two diametrically opposite recesses or undercuts 18b at its inner end each of these recesses being below the wide part of the stem and being of a sufficient depth to reduce the diameter of the portion of the stem intervening between them to substantially the same dimension as the diameter of the valve stem bore 21. Said recesses 18b provide needed clearance to accommodate the inner portion of the deformed parts of the stem 18a when the latter is forced into the valve stem bore 21 a sufficient distance to bring the flat top of the plug body or flange part 20 into an abutting relation to the end of the valve stem 15. When the stem 18a is deformed in conformity with the bore 21 into which it is inserted, said stem will assume the dotted line shape shown in Fig. 4.

In both embodiments of the invention the stem is of a one-piece character and opposite side portions of it, when viewed in transverse section in an undeformed condition, have convexities, the diameter of the stem, measured by a line extending through said convexities, being greater than the diameter of the stem as measured by a line extending at a right angle to the first mentioned line. Said convexities consist of the buttons 22 in the species shown in Figs. 2 and 3, whereas in Figs. 4 and 5 said convexities consist of the more acutely curved end portions of the ellipse which defines substantially all parts of the transverse section of the stem except its undercut part 18b.

Also in both embodiments of the plug the upper end of its stem has a convexity 23 which facilitates the introduction of said stem into the valve seat bore 21. Also, in both forms, the stem portion of the valve plug should be made of a more compressible or deformable character than the remaining portion thereof. This is more important regarding the form of the plug shown in Figs. 4 and 5, for in this embodiment a greater amount of deformation necessarily takes place when the stem portion of the plug is forced into the position shown in Fig. 1. The end portions of the ellipse forcibly engage diametrically opposite sides of the bore with an increased pressure, which securely retains the valve plug in its inserted position.

Also, in both embodiments of the invention, the conical part 19 of the plug is quite steeply tapered and is surrounded at its inner end by a slightly tapered annular area 19x which terminates at the periphery of the circular body portion 20 of the plug. These combined conical and slightly tapered gasket portions cooperate to form a streamline surface to silence the flow of liquid through the passage 14, since in the open position of the valve the conical portion 19 thereof occupies the greater part of the cross section of the outlet channel.

The silencing effect of the plug upon a stream of water passing through the open valve is attributable to the fact that the conical lower part of the plug always projects through and below the valve seat and consequently spreads the current out into a conical sheet of liquid which flows across the circular edge of the valve seat in a quiescent manner, rather than in the turbulent fashion characteristic of conventional faucet valve structures.

The claimed invention is not limited to varying the cross sectional contour of the valve stem in the particular fashion illustrated in the drawing, but include in its scope such other desired equivalent variations as may suggest themselves to persons skilled in the art.

What is claimed is:

1. As an article of manufacture a top-shaped valve plug having a generally cylindrical stem portion which is adapted to be inserted axially into the cylindrical bore of a conventional valve stem, said stem portion of said plug being a unitary part of the plug and having a plurality of circumferentially spaced compressible deformable side portions occupying only restricted parts of its periphery and which in the unstressed condition extend somewhat beyond a cylindrical space coextensive with the bore of the valve stem upon which the plug is adapted to be mounted.

2. As an article of manufacture a top-shaped valve plug having a stem portion which is adapted to be inserted avially into the cylindrical bore of a conventional valve stem, said stem portion of said plug being a unitary part of the plug and being elliptical in cross section with a mean diameter which is approximately the same as the diameter of said bore of said conventional valve stem into which it is adapted to be inserted.

3. The subject matter of claim 2, and the inner end portion of the stem of said plug having at each side a recess whereby the long axis of the diameter of its said ellipse is reduced.

4. As an article of manufacture, a screwless top-shaped unitary valve plug having a circular disk-like body portion from one side of which projects an axial stem and from the opposite side of which extends axially a steeply tapered conical projection, the inner portion of said conical projection being surrounded by a streamlined annular area which is but slightly tapered and which terminates at the periphery of the plug, said stem being provided with a plurality of circumferentially spaced deformable side portions which increase the diameter of the stem measured by a line extending through said deformable portions.

5. The combination, with a valve stem having a non-threaded bore leading into it; of a top-shaped valve plug having an axial generally cylindrical stem portion which is adapted to be inserted axially into said bore, said stem being a unitary part of the plug and having compressible deformable side portions which vary from a true circle and which, in the unstressed condition extend somewhat beyond a cylindrical space coextensive with the bore of the valve stem into which said stem is adapted to be inserted.

6. An article of manufacture comprising a circular plug part adapted to engage a valve seat and a deformable stem projecting axially from said plug part, said stem, when viewed in a transverse section in an unstressed condition having at opposite sides convexities, the diameter of the stem measured by a line extending through said convexities being greater than the diameter of the stem as measured by a line extending at a right angle to the first mentioned line.

7. The subject matter of claim 1, and said deformable portions of said stem of said plug consisting of beveled button-like radially projecting parts thereof.

8. As an article of manufacture a top-shaped valve plug having a stem portion which is adapted to be inserted axialy into the cylindrical bore of a conventional valve stem, said stem portion of said plug being a unitary part of the plug and having a plurality of circumferentially spaced deformable side portions occupying only restricted parts of its periphery and which in the unstressed condition extend somewhat beyond a cylindrical space coextensive with the bore of the valve stem upon which the plug is adapted to be mounted, said deformable portions of said stem consisting of button-like radially projecting parts thereof.

9. The combination, with a valve stem having a non-threaded bore leading into it; of a valve plug having a disk-like body portion from one side of which projects an axial stem portion which is adapted to be inserted into said bore with a friction tight fit, said plug having an axial conical projection on the side of said body portion opposite to said stem, said disk-like body portion having a flat face which surrounds the base of said stem and is adapted to abut in a flatwise manner against the under side of the valve stem into which said stem is adapted to be inserted, said stem being provided with circumferentially spaced compressible deformable side portions which in the unstressed condition project diametrically somewhat beyond the cylindrical space coextensive with the bore of the valve stem upon which the plug is adapted to be mounted, said projecting portions of said stem also projecting diametrically beyond the portions of said stem intervening between them.

BENNETT SVIRSKY.